United States Patent

Chenault et al.

[11] Patent Number: 5,573,134
[45] Date of Patent: Nov. 12, 1996

[54] CONTAINER WITH CURLED TAMPER-EVIDENT BAND TO RETAIN CLOSURE

[75] Inventors: Rawson L. Chenault, San Jose; Daniel Luch, Morgan Hill, both of Calif.

[73] Assignee: Portola Packaging, Inc., San Jose, Calif.

[21] Appl. No.: 217,610

[22] Filed: Mar. 24, 1994

Related U.S. Application Data

[63] Continuation-in-part of Ser. No. 35,408, Mar. 23, 1993, Pat. No. 5,398,836, and Ser. No. 190,270, Feb. 2, 1994, Pat. No. 5,528,814, which is a continuation of Ser. No. 957,402, Oct. 6, 1992, Pat. No. 5,283,940, which is a division of Ser. No. 741,650, Aug. 7, 1991, Pat. No. 5,163,575.

[51] Int. Cl.$^6$ .......................... B65D 17/40; B65D 45/30
[52] U.S. Cl. .................. 220/276; 215/250; 215/274; 220/319
[58] Field of Search .................... 220/270, 276, 220/692, 693, 616, 319; 215/250, 256, 274; 206/807; 229/5.6, 5.7, 5.8, 123.2

[56] References Cited

U.S. PATENT DOCUMENTS

| | | | |
|---|---|---|---|
| 1,961,559 | 6/1934 | Herrmann | 229/5.6 |
| 2,134,984 | 11/1938 | Page | 229/5.7 |
| 3,268,105 | 8/1966 | Geiger | 229/123.2 |
| 3,902,630 | 9/1975 | Knize | 220/319 |
| 4,016,807 | 4/1977 | Schellenberg | 229/123.2 X |
| 4,171,062 | 10/1979 | Allen et al. | 220/270 |
| 4,362,253 | 12/1982 | Wortley et al. | 220/276 |
| 4,645,087 | 2/1987 | Kusz | 220/319 X |
| 4,718,571 | 1/1988 | Bordner | 220/270 |
| 4,732,293 | 3/1988 | Landis | 220/276 |
| 4,878,595 | 11/1989 | Uhlig | 206/807 X |
| 4,909,434 | 3/1990 | Jones et al. | 229/125 |
| 4,934,554 | 6/1990 | Edwards | 220/266 |
| 4,966,292 | 10/1990 | Marino | 215/256 |
| 5,052,574 | 10/1991 | McKinnon et al. | 220/276 |
| 5,111,953 | 5/1992 | Faust et al. | 206/807 X |
| 5,170,905 | 12/1992 | Luch | 220/276 |
| 5,249,694 | 10/1993 | Nelson | 220/276 |
| 5,253,772 | 10/1993 | Earnest | 229/123.2 |

Primary Examiner—Allan N. Shoap
Assistant Examiner—Nathan Newhouse
Attorney, Agent, or Firm—Julian Caplan

[57] ABSTRACT

A container having a body and a tamper-evident band and a lid for closing the container. The band has a proximal portion frangibly attached to the container body and a distal portion. The distal portion of the band is deformable to an inward extending orientation with the distal portion shaped and positioned to extend inwardly across the peripheral outer portion of a lid. The deformed distal portion of the band optionally has a curvature of 90° to 360° or more. The lid optionally has an annular groove for concealing the terminus of the band. The lid may also have an outward extending peripheral flange, an upward extending annular rib and a stacking ring for arranging several lids in a nested stack.

18 Claims, 9 Drawing Sheets

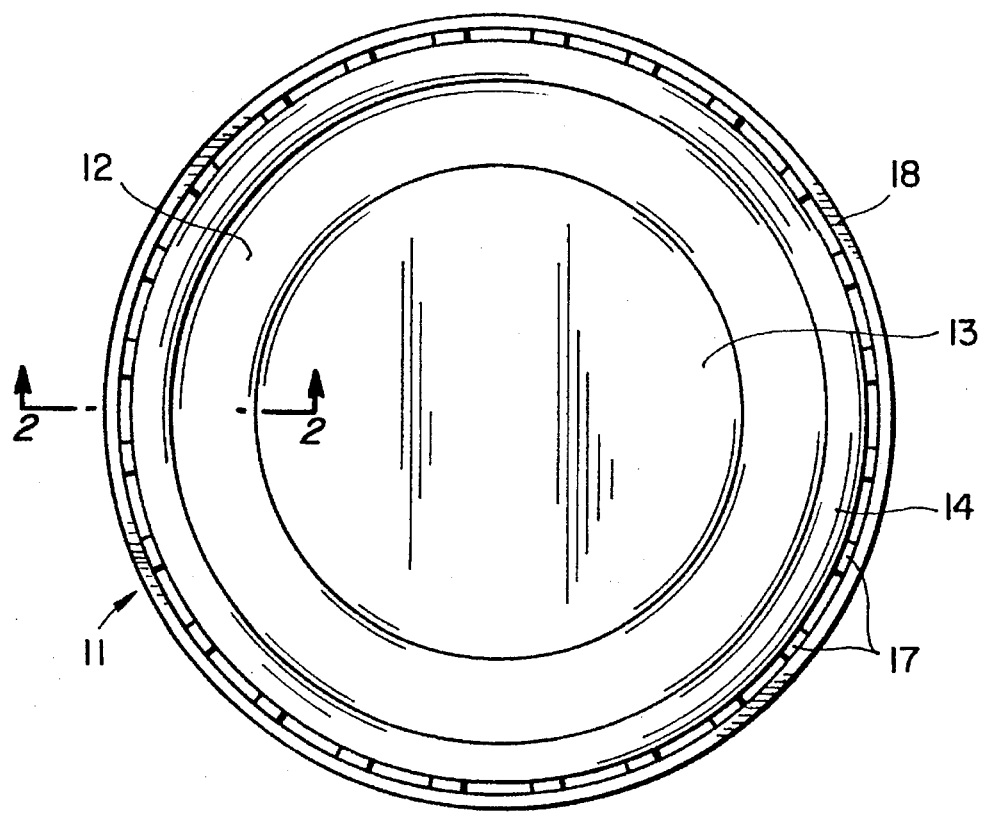
FIG_1
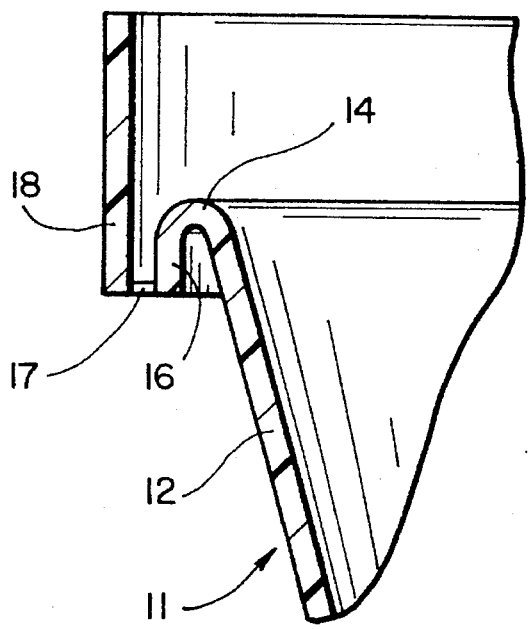
FIG_2
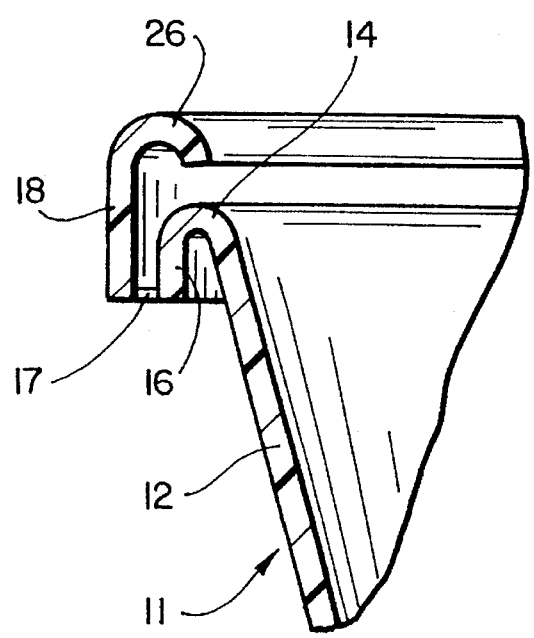
FIG_4

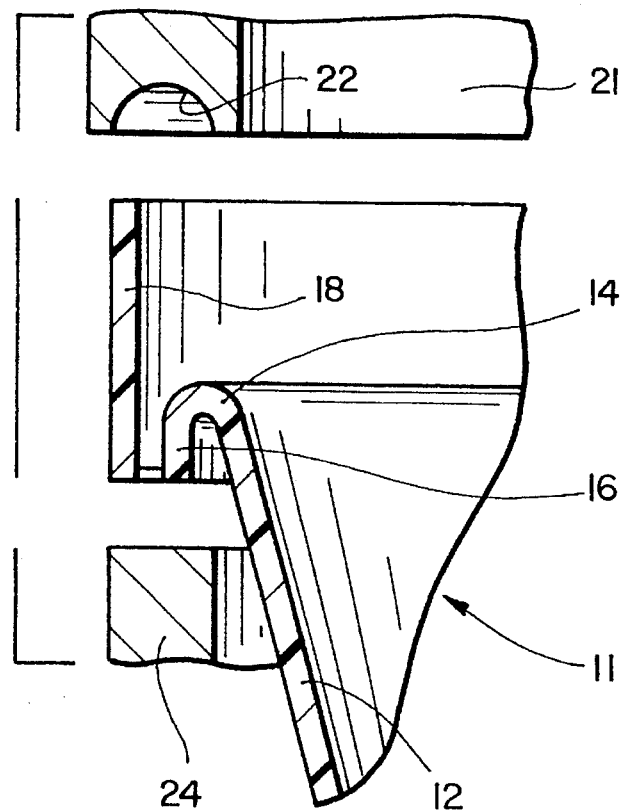
FIG_3
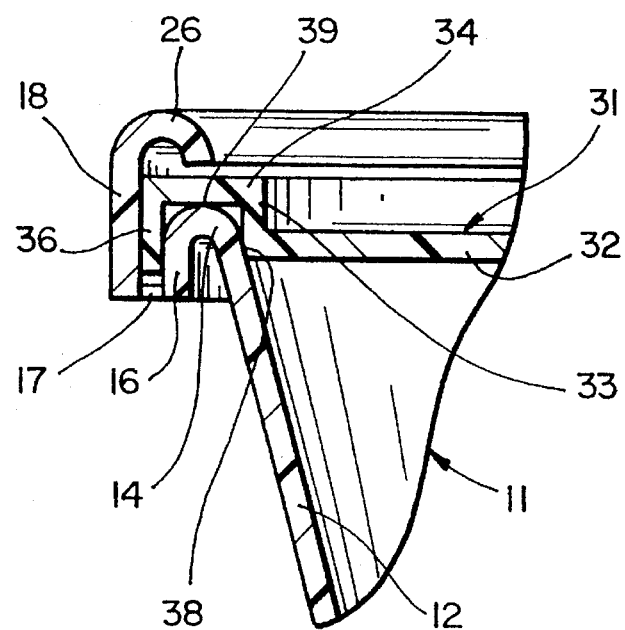
FIG_5

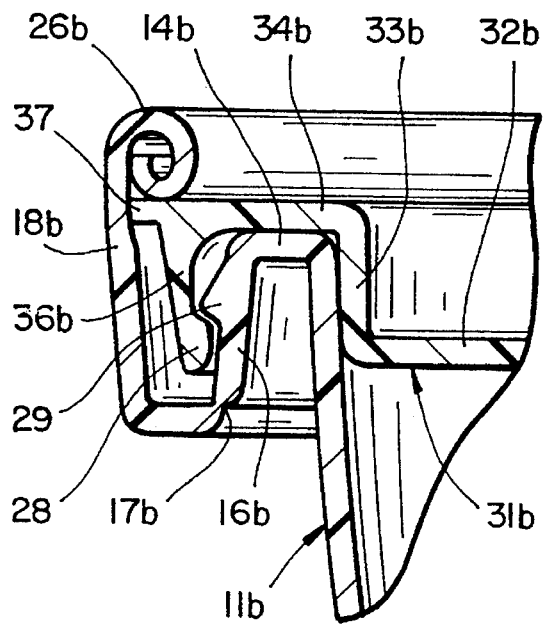
FIG_6
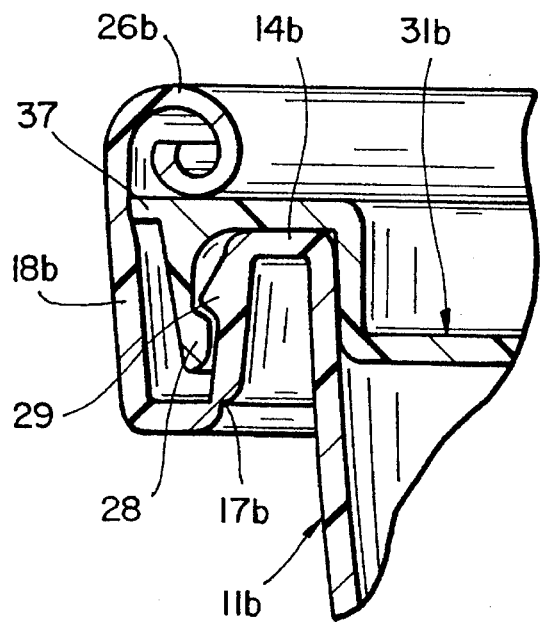
FIG_6A
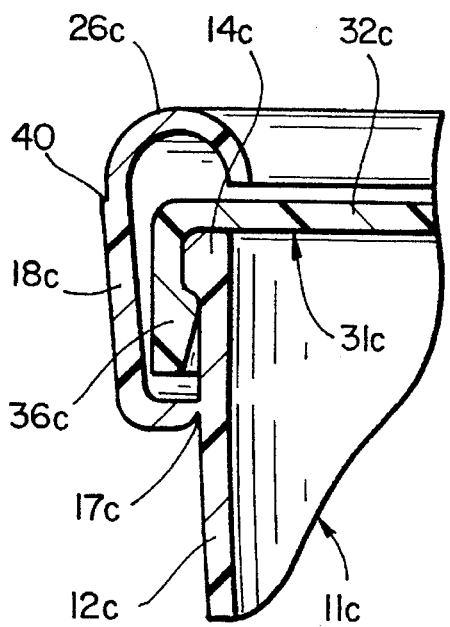
FIG_7
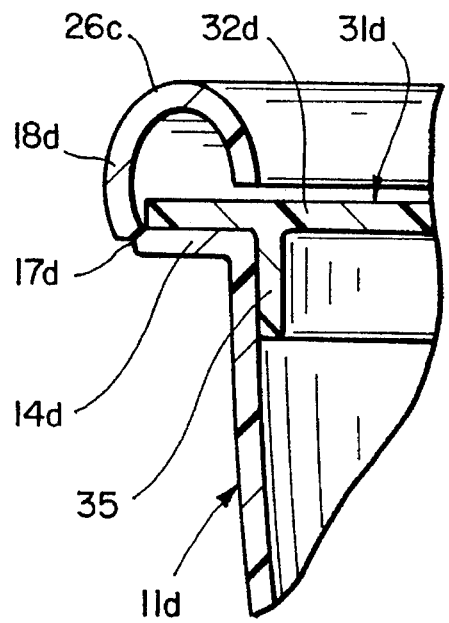
FIG_8

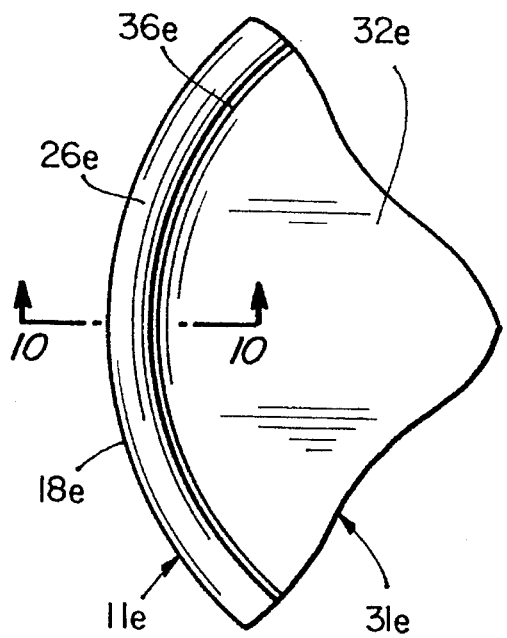
FIG_9
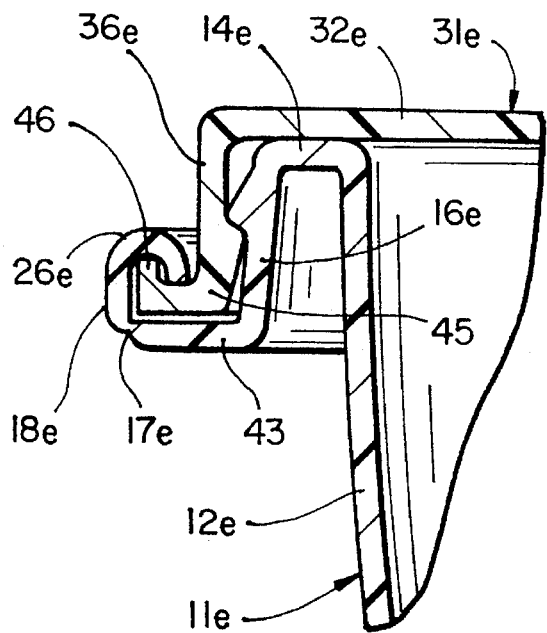
FIG_10
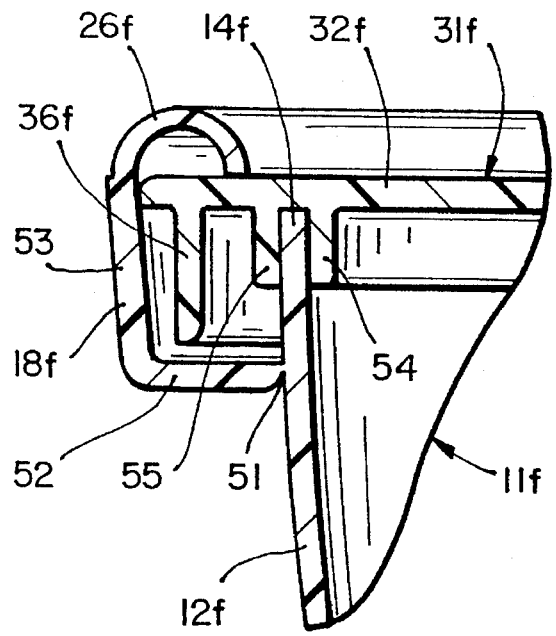
FIG_11

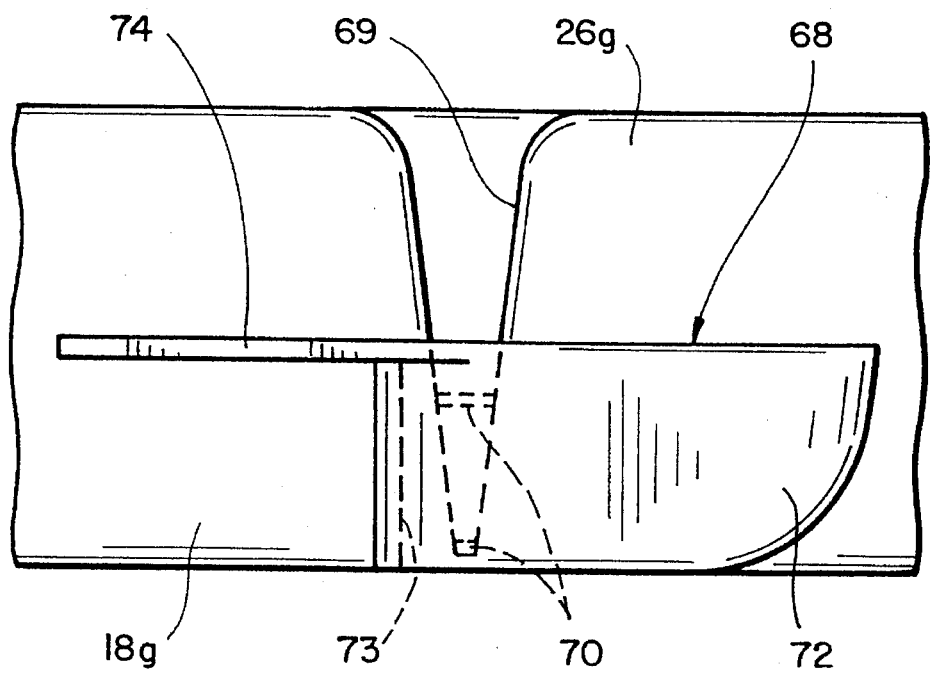
FIG_12
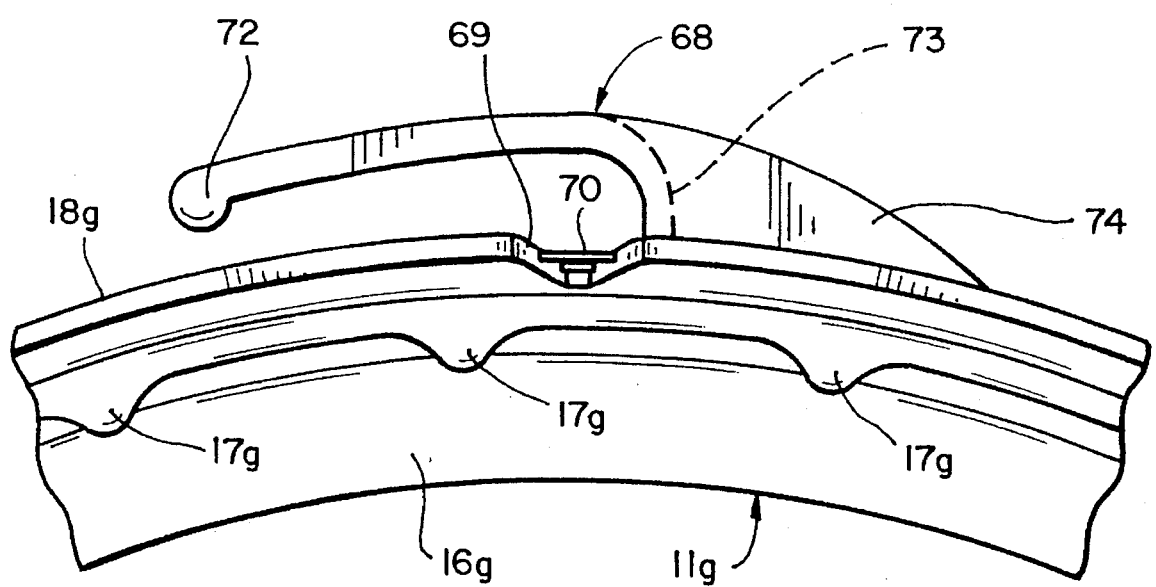
FIG_13

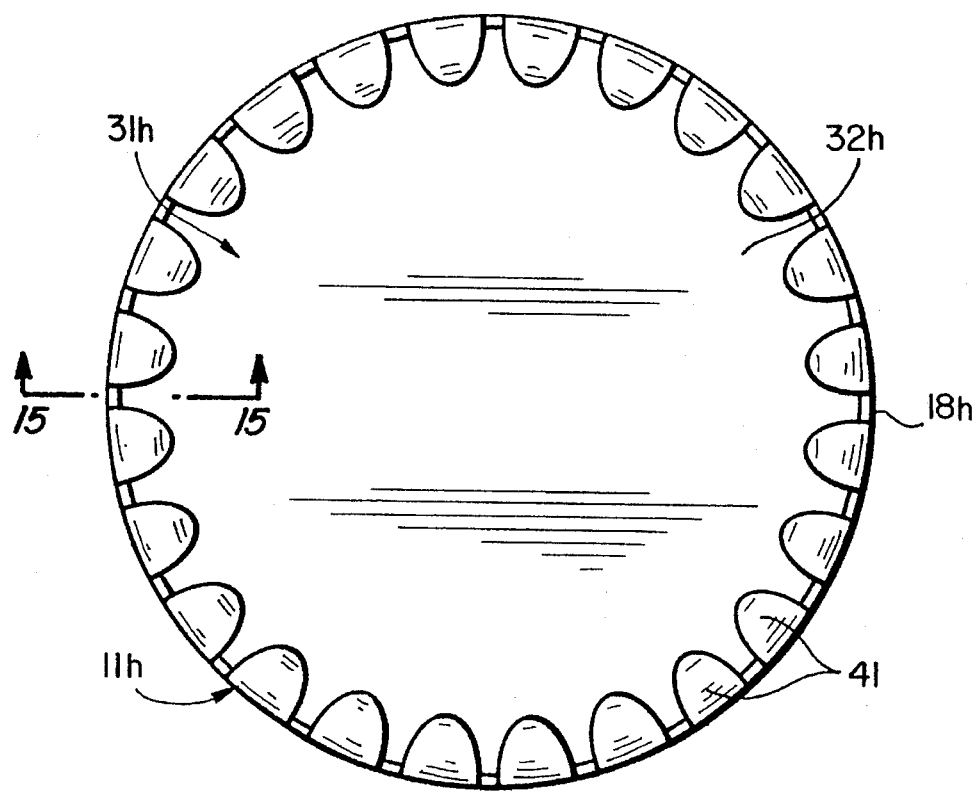
FIG_14
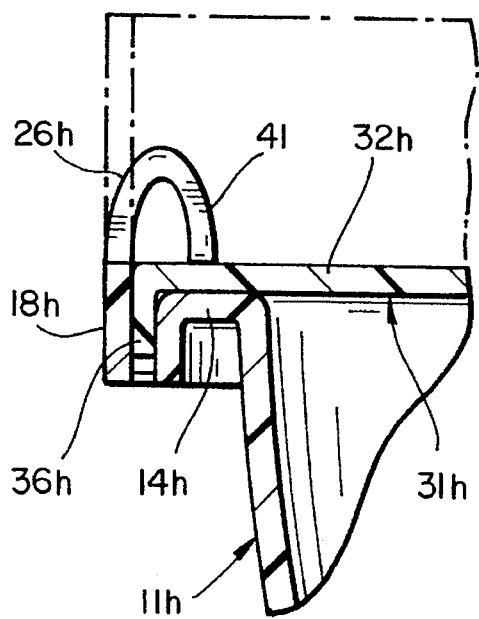
FIG_15
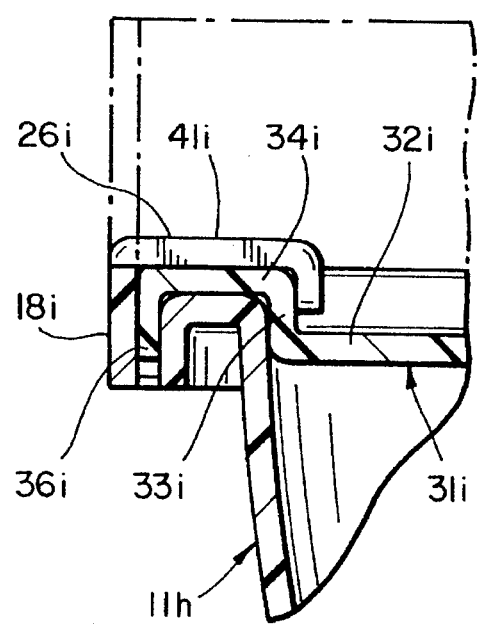
FIG_16

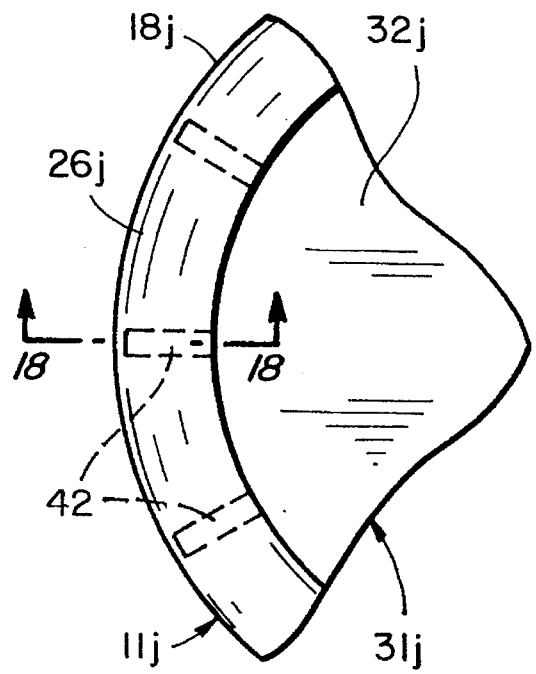
FIG_17
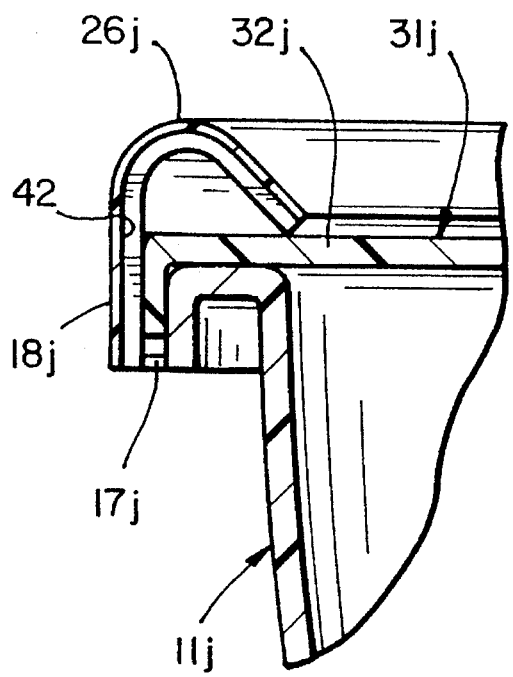
FIG_18

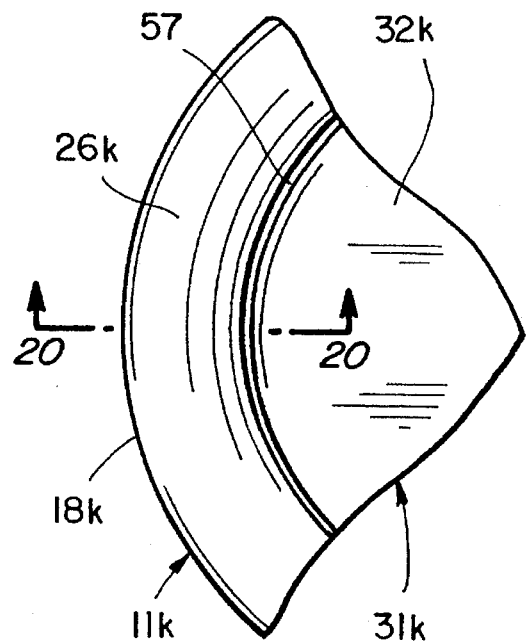
FIG_19
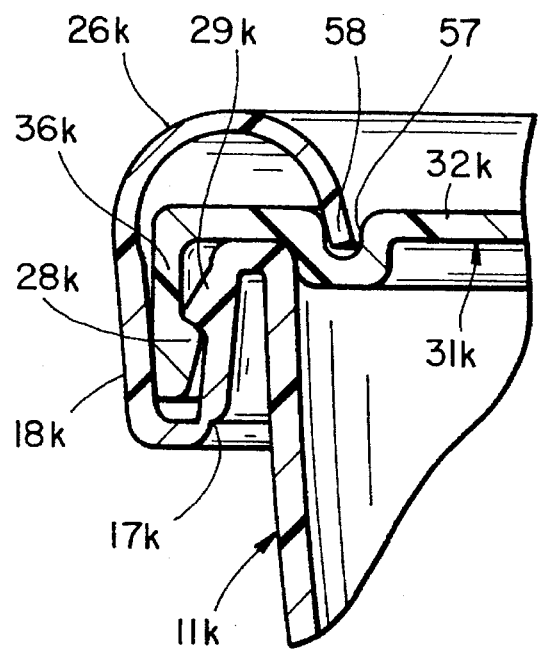
FIG_20
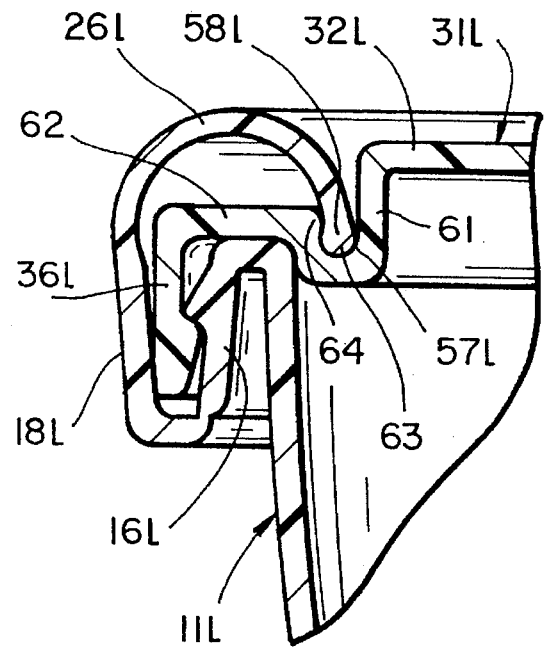
FIG_21

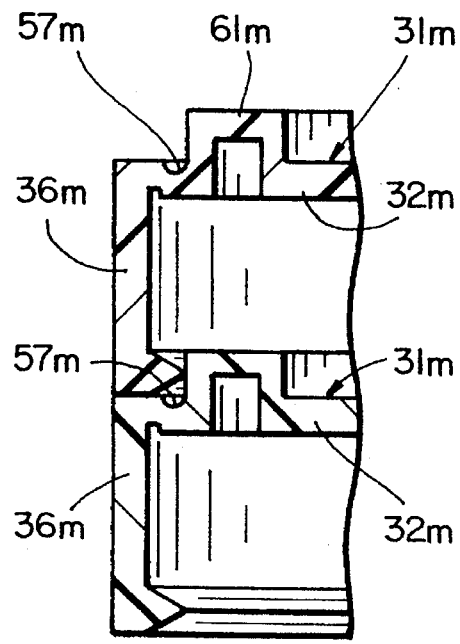
FIG_22
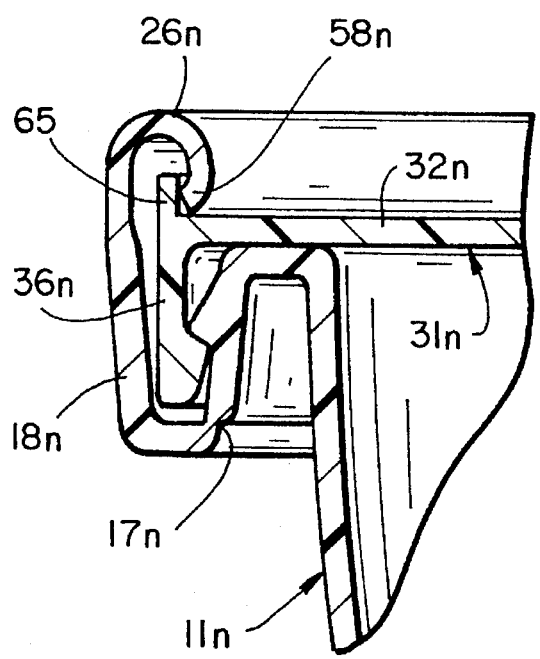
FIG_23
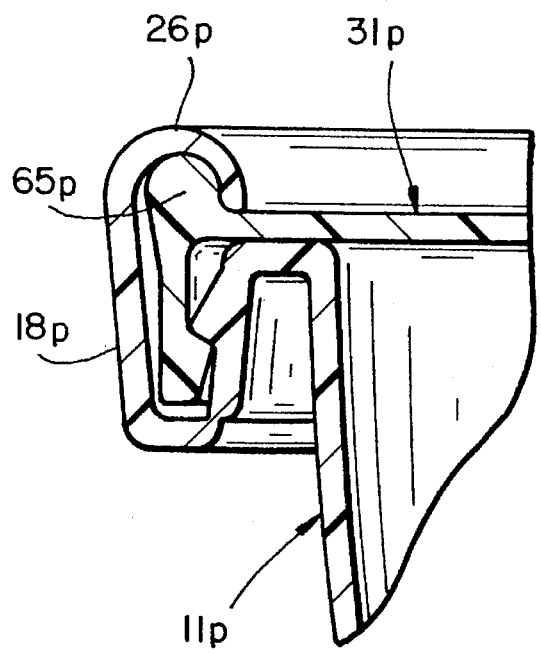
FIG_24

CONTAINER WITH CURLED TAMPER-EVIDENT BAND TO RETAIN CLOSURE

CROSS-REFERENCE TO RELATED APPLICATIONS

This application is a continuation-in-part of U.S. Ser. No. 08/190,270, filed Feb. 2, 1994, now U.S. Pat. No. 5,528,814 which is a continuation of U.S. Ser. No. 07/957,402, filed Oct. 6, 1992, now U.S. Pat. No. 5,283,940, which is a division of U.S. Ser. No. 07/741,650, filed Aug. 7, 1991, now U.S. Pat. No. 5,163,575.

This application is also a continuation-in-part of U.S. Ser. No. 08/035,408, filed Mar. 23, 1993, now U.S. Pat. No. 5,598,836.

The disclosures of the above applications are hereby incorporated herein by reference.

BACKGROUND OF THE INVENTION

1. Field of the Invention

This invention relates to a new and improved container having a tamper-evident band and a lid for closing the container. More particularly, the invention relates to a thin-walled, wide mouth container having a band which is curled inwardly to retain the lid on the container. The band must be fractured or removed from the container before the lid may be removed from the container.

2. Description of Related Art

The use of tamper-evident bands on containers of this general type is known in the art. Letica U.S. Pat. No. 4,711,364 shows a container having a tamper-evident band and a lid for closing the container. However, the lid is held in place by snap action, not the tamper-evident band. In the present invention, a portion of the tamper-evident band is deformed inwardly to retain the lid on the container. Thus, the band of the present invention provides a highly effective tamper-evidencing means as the band must be fractured or removed before the lid may be removed from the container.

Curling of plastic cylindrical bands is known in the art. For example, applying a concave tool to the edge of a cylindrical plastic member is shown in numerous patents to Thompson, such as U.S. Pat. Nos. 4,708,255; 4,709,824; 4,793,506; 4,872,304; 4,823,967; 4,811,857; and 5,856,667. These patents disclose a resilient curled bead which is compressed when a screw closure is applied to a container neck. Similar curling techniques are employed in the present invention to curl the tamper-evident band. However, the inwardly deformed portion of the band is employed for a totally different purpose than the curled beads of the foregoing Thompson patents, namely, the band curls over a portion of the lid and prevents removal of the lid so long as the band is intact.

SUMMARY OF THE INVENTION

In accordance with the present invention, a container having a curlable tamper-evident band and a lid for closing the container are provided. The tamper-evident band extends circumferentially around the container body and preferably has a proximal portion frangibly connected to the exterior of the container. A distal portion of the band is deformable to an inward extending orientation. When deformed, the distal portion is shaped and positioned to extend across a peripheral outer portion of a lid to retain the lid on the container. The lid may be applied to the container either before or after deformation of the band. If the band is deformed before application of the lid, the distal portion of the band is preferably provided with a tight curvature and the lid preferably has a downward directed outer skirt. When the lid is applied to the container, the outer skirt engages the deformed distal portion of the band and urges the distal portion outward so that the lid may slip beneath the tamper-evident band. The tamper-evident band must be fractured or removed from the container before the lid may be removed.

The container may have various shapes in accordance with the invention as shown in the drawings. In one modification, the container lip has a downward directed portion and the tamper-evident band is joined to the downward directed portion by a frangible line of weakness. In another modification, the container body has an annular, outward extending flange below the container lip and the band is frangibly attached to the outward extending flange. Alternatively, the tamper-evident band may be frangibly joined to the exterior of the body wall below the lip. When the band is deformed, the deformed distal portion is shaped and positioned to extend inwardly across the peripheral outer portion of the lid. The distal portion may be spaced outwardly of the container lip, or the distal portion may be opposed to and spaced above the lip of the container. In some modifications of the invention, the terminus of the band may be positioned inwardly of the container lip when the band is deformed. The band optionally has a tear tab for removal of the band from the container.

The lid generally has a top and a peripheral outer portion positioned below the deformed distal portion of the tamper-evident band. The lid may include a downward directed outer skirt engaging the exterior of the container. The top of the lid optionally includes a groove adapted to receive the terminus of the deformed portion of the band to conceal the band terminus and further prevent removal of the lid without first fracturing or removing the tamper-evident band. The inner wall of the groove and the band may have locking means to retain the band terminus in the groove. The lid optionally includes a stacking ring for efficiently and securely arranging several lids in a vertical stack. The lid may include a peripheral flange to promote a tighter fit between the lid and the tamper-evident band and to facilitate removal of the lid from the container. Further, the peripheral outer portion of the lid may be formed with an annular, upward extending rib which is concealed by the terminus of the band for improved tamper-evidence.

The deformed portion of the band may be flat or curved and may have a total curvature of approximately 90° to 360° or more. The deformed portion of the band may be continuous or interrupted. The tamper-evident band may have one or more lines of weakness extending vertically through the band. If an attempt is made to remove the lid without first removing the band, one or more of the weakened lines will fracture to provide evidence of possible tampering.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a top plan view of a container formed in accordance with the present invention before curling of the tamper-evident band.

FIG. 2 is a sectional view taken substantially along line 2—2 of FIG. 1.

FIG. 3 is a schematic exploded sectional view showing the curling tools immediately before engaging the tamper-evident band.

FIG. 4 is a view similar to FIG. 2 showing the curl formed in the upper edge of the band.

FIG. 5 is a sectional view showing the lid applied to the container.

FIG. 6 is a view similar to FIG. 5 showing a modified container and lid.

FIG. 6A is a view similar to FIG. 6 showing a different curvature of the distal portion of the band.

FIG. 7 is a view similar to FIG. 5 showing another modified container and lid.

FIG. 8 is view similar to FIG. 5 showing another modified container and lid.

FIG. 9 is a top plan view partially broken away of another modified container and lid.

FIG. 10 is a sectional view taken substantially along line 10—10 of FIG. 9.

FIG. 11 is a section view similar to FIG. 10 of yet another modified container and lid.

FIG. 12 is an enlarged, side elevational view of a modified container in the area of the tear tab.

FIG. 13 is a top plan view of the structure of FIG. 12.

FIG. 14 is a top plan view of still another modified container and lid.

FIG. 15 is a sectional view taken substantially along line 15—15 of FIG. 14.

FIG. 16 is a sectional view similar to FIG. 15 of a modified container and lid.

FIG. 17 is a top plan view partially broken away of a modified container and lid.

FIG. 18 is a sectional view taken substantially along line 18—18 of FIG. 17.

FIG. 19 is a top plan view of still another modified container and lid.

FIG. 20 is a sectional view taken substantially along line 20—20 of FIG. 19.

FIG. 21 is a sectional view similar to FIG. 20 of another modified container and lid.

FIG. 22 is an enlarged sectional view of modified lids.

FIG. 23 is a sectional view similar to FIG. 20 of a modified lid and container.

FIG. 24 is a sectional view similar to FIG. 20 of another modified lid and container.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Container 11 is essentially a thin-walled, wide mouth container of the type used for yogurt and dairy products such as margarine, cottage cheese, and the like. It will be understood that the structure of container 11 is subject to considerable variation. As shown in FIGS. 1–5, the container 11 has an upwardly-outwardly inclined conical wall 12, a bottom 13 and an lip 14 at the top of wall 12. The lip 14 defines an outward extending surface of the container and merges in a downward extending portion 16. A plurality of horizontally extending bridges 17 extend outward from the lower edge of the downward extending portion 16 to form a frangible line of weakness. A tamper-evident band 18 spaced outward of the container is connected to the container 11 by the bridges 17.

In the depicted embodiment, the band 18 is initially substantially cylindrical as is shown particularly in FIG. 2. The band is formed to the condition shown in FIG. 4 using the tooling shown in FIG. 3. A ring-shaped tool 21 having a concavity 22 is positioned above the upper edge of band 18, while a second ring-shaped tool 24 is positioned below the band to support bridges 17 and the bottom edge of the band 18. The tool 21 is lowered toward the band with the concavity 22 engaging and bending the upper edge of the band 18 inward to form a deformed distal portion 26. The deformed portion 26 extends partially across and is spaced from the outward extending lip 14.

A lid 31 for closing the container 11 is shown in FIG. 5. In the depicted embodiment, the lid 31 has a top disc 32 of a diameter less than the diameter of the container wall 12. The periphery of the lid 31 has an upward extending edge 33 formed along the outer edge of the disc 32, an annular ring 34 extending outwardly from the edge 33 and a downward directed skirt 36 depending from the ring 34. The upward extending edge 33 may be dimensioned to receive the bottom 13 of a second container.

Lid 31 may be applied to the container 11 either before or after the deformation of distal portion 26. When the distal portion 26 is formed to the condition shown in FIG. 4, lid 31 may be applied by moving the lid 31 vertically downward onto the container. The bottom edge of skirt 36 engages the deformed portion 26 and bends it sufficiently outward so that the lid may pass beyond the deformed portion 26 and seat on the container 11 as shown in FIG. 5. Because of the resilient nature of the bridges 17 and the band 18, the deformed distal portion substantially returns to the position shown in FIG. 4. The container is sealed by a first circle of contact 38 between the upward extending edge 33 and the interior of wall 12 and a second circle of contact 39 between the underside of ring 34 and the top of lip 14.

As shown in FIG. 5, the deformed portion 26 extends partially across the ring 34 of the lid to thereby hold the lid on the container. A consumer may not remove the lid without fracturing bridges 17, thereby giving evidence of tampering. When one wishes to open the container, band 18 is broken away by fracturing bridges 17 and the lid 31 is removed by prying upward on the bottom edge of the skirt 36. If the contents of the container are not completely consumed, the lid 31 may be pushed onto the container 11.

The shape and total curvature of the deformed distal portion 26 of the tamper-evident band is subject to considerable variation. For example, in the embodiment illustrated in FIGS. 1–5 the deformed portion is curled sufficiently to position the terminus of the band directly above the lip 14 of the container. A modified container 11b with a deformed portion 26b having a total curvature of approximately 360° is shown in FIGS. 6 and 6A. Providing the deformed portion 26b of the band with a tight curl of 360° or more essentially increases the thickness of the band above the lip 14b of the container 11b. The increased thickness of the deformed portion 26b above the lip and the concealment of the terminus of the band inside the deformed portion 26*b* further prevents removal of the lid 31*b* from the container without fracturing bridges 17*b* or removing the tamper-evident band 18*b*. The deformed portion may have a tight curvature as shown in FIG. 6 or the curvature of the band may be loose as shown in FIG. 6A.

A modified lid 31*b* is used with the container 11*b*. The lid 31*b* has a top disc 32*b*, an upward directed portion 33*b* and an annular ring 34*b*. A downward directed outer skirt 36*b* depends from the disc 32*b* and a peripheral flange 37 extends circumferentially around the peripheral edge of the ring 34*b*. The interior of skirt 36*b* is preferably formed with a locking bead 28 which snaps under a locking bead 29 formed on the exterior of the downward extending portion 16*b* to retain the lid on the container when used as a reclosure lid. Since the band 18*b* is resilient, the lid 31*b* may be applied to the container 11*b* either before or after the distal portion 26*b* is deformed. If the lid is to be applied after deformation of the band, a tight curvature as shown in FIG. 6 is preferably used so that the outer skirt 36*b* may engage the inner edge of portion 26*b* and urge the deformed portion outward, allowing the lid to slip beneath the tamper-evident band. When the lid is applied before deformation of the band, the deformed distal portion may have a tight curvature (FIG. 6) or a loose curvature (FIG. 6A) as desired. The engagement between the beads 28 and 29 retains the lid on the container 11*b* until the band is deformed and prevents unintentional dislodgement of the lid from the container during the deformation process.

The deformed distal portion 26*b* extends partially across the periphery of the lid to retain the lid 31*b* on the container 11*b*. The flange 37 provides the deformed distal portion 26*b* with a tight fit, further preventing the removal of lid 31*b* with the tamper-evident band 18*b* intact.

FIG. 7 illustrates a further modification of the invention. Container 11*c* has a tamper-evident band 18*c* frangibly connected to the exterior of wall 12*c* by a plurality of bridges 17*c*. The band 18*c* has a step or break 40, with the band above the step 40 being thinner than the band below the step. The thin portion of the band is easier to curl, facilitating the deformation of the distal portion 26*c*. The thicker portion of the band substantially retains its original orientation after deformation of the band 18*c* as the thicker portion is more difficult to bend. Providing the band with a thin portion above step 40 which may be easily deformed and a thicker portion below step 40 also facilitates molding of the container.

The container 11*c* is closed by a lid 31*c* having a top disc 32*c* and an outer skirt 36*c* depending from the peripheral edge of the top. The deformed distal portion 26*c* of the band 18*c* shown in FIG. 7 is bent with a broad curvature to a downward-inward extending orientation covering the outer peripheral portion of the lid 31*c* and extending inwardly of the lip 14*c* of the container. Although the terminus of the band 18*c* is spaced inwardly of the lip 14*c* in FIG. 7, the position of the band terminus relative to the lip 14*c* may vary and the length of the deformed portion 26*c* may be increased or decreased as desired. In this embodiment, the lid 31*c* is preferably applied before the band is deformed. The deformed portion 26*c* covers the peripheral outer portion of the lid 31*c*, preventing removal of the lid without first fracturing bridges 17*c* and removing the tamper-evident band 18*c*.

A further modification of a container 11*d* and lid 31*d* is shown in FIG. 8. The container 11*d* has a outward extending lip flange 14*d* and a tamper-evident band 18*d* frangibly attached to the peripheral edge of the lip flange 14*d* by a plurality of bridges 17*d*. The lid 31*d* has a generally flat top 32*d* and an inner plug 35 depending from the underside of the disc 32*d* to seal the container. The deformed distal portion 26*d* of the band is deformed inwardly to extend across the peripheral outer portion of the lid and retain the lid on the container.

In the previously described embodiments, the deformed distal portion of the band extends above the lip of the container. In other modifications of the invention, the distal portion of the band is not spaced above the container lip. For example, in the modification shown in FIGS. 9 and 10, container 11*e* has an upward outward inclined wall 12*e* terminating in a rim or lip 14*e* and a downward directed portion 16*e* depending from the lip. An annular flange 43 extends outwardly from the lower edge of the downward directed portion 16*e*. The tamper-evident band 18*e* is connected to the flange 43 by a plurality of bridges 17*e* between the flange and the band 18*e*. The bridges 17*e* form a frangible line of weakness extending circumferentially around the container. The band 18*e* has a deformed distal portion 26*e* which extends partially across the flange 43. The total curvature of the deformed portion 26*e* may increased or decreased as desired.

The container 11*e* is closed by a modified lid 31*e* which has a top disc 32*e*, a downward directed skirt 36*e* depending from the periphery of the disc 32*e* and a flange 45 extending outwardly from the bottom edge of the skirt. Optionally, the lid has an upward extending rib 46 at the peripheral edge of the flange 45. The lid flange 45 is spaced above the annular flange 43 of the container when the lid is seated on the container. The deformed portion 26*e* of the band extends inwardly across the lid flange 45 to hold the lid on the container, preventing removal of the lid 31*e* so long as the tamper-evident band 18*e* remains intact. In the modification shown in FIGS. 9 and 10, the deformed distal portion 26*e* extends around the rib 46, substantially preventing any attempts to pry the lid from the container 11*e* with band 18*e* intact.

The lid 31*e* is preferably applied to the container before the deformation of the tamper-evident band, although in other modifications the deformed distal portion 26*e* may have a curvature which allows the lid to be applied after the band is deformed. In the event the band 18*e* is deformed before application of the lid 31*e*, the peripheral edge of the lid flange 45 urges the deformed portion 26*e* outward as the lid is lowered onto the container so that the lid may pass beneath the tamper-evident band.

In the embodiment depicted in FIG. 11, container 11*f* has a wall 12*f*, a lip 14*f* and a tamper-evident band 18*f* joined to the exterior of the wall 12*f* below the lip by a frangible line of weakness 51. Starting from the frangible line of weakness 51, the tamper-evident band 18*f* has an outward extending stretch 52, a vertical stretch 53 and a distal portion 26*f*. The outward extending stretch 52 provides a support structure for supporting the band and in some instances the container during deformation of the distal portion 26*f*. The distal portion 26*f* is deformed to a curved, inward extending orientation.

A modified lid 31*f* is applied to the container 11*f*. Lid 31*f* has a top disc 32*f*, a downward directed outer skirt 36*f* depending from the outer edge of the disc 32*f*, and a peripheral flange 37*f* extending outwardly from the disc. A pair of inner skirts 54 and 55 depending from the underside of the disc 32*f* engage the interior and exterior of the container wall 12*f* to seal the container. If the lid 31*f* is used to reclose the container, the skirts 54 and 55 hold the lid on the container. As with the previous embodiments, the lid 31f may be applied to the container 11f either before or after the deformed portion 26f is formed. After the lid 31f has been seated on the container and the band 18f has been deformed, the deformed distal portion 26f extends partially across the peripheral outer portion of the lid to retain the lid on the container.

The container may also have means for removing the tamper-evident band from the container. Turning to FIGS. 12 and 13, a container 11g has a tear tab 68 joined to the tamper-evident band 18g. The band 18g has a notch 69 extending through the band. At least one thin connector or bridge 70 extends across the notch to retain the band in shape. The tear tab 68 extends along the lower portion of the band 18g and has a curved free end 72 which facilitates gripping of the tab by a consumer. The tab 68 is preferably offset outwardly relative to the band 18g as shown in FIG. 13 and is connected to the band by an inward-curved connector portion 73. A horizontally disposed gusset 74 connects the tab 68 to the wall of the band 18g at a position spaced from the notch 69. The gusset prevents separation of the tab 68 from the band when the tab is pulled to remove the band 18g from the container 11g.

The tab 68 preferably has a generally horizontal orientation so that the tab does not interfere with the deformation of the band or the handling of the containers. The horizontal orientation and reduced thickness of the tab 68 provides sufficient space for deforming the distal portion 26g without destroying the tab. The filling and labeling processes known in the art typically separate individual containers from a vertical, nested stack by inserting a feed screw or other component into the gap between containers. The horizontal tab 68 is particularly suitable for use with these processes as the tab does not obstruct the gap between the nested containers. Although a generally horizontal tear tab is preferred, it is to be understood that the tab may extend above the deformed distal portion or depend below the tamper-evident band if desired.

The tamper-evident band of the container may be substantially continuous as shown in FIGS. 1–13 or the band may have other configurations as shown for example in FIGS. 14–18. Turning first to FIGS. 14 and 15, container 11h includes a tamper-evident band 18h having an edge formed with scallops 41. When the band is deformed, the distal portion 26h of the band is bent downwardly-inwardly with the scallops 41 extending inwardly across the peripheral outer edge of the lid 31h. The deformed distal portion 26h may be substantially flat or the deformed portion may be curved as shown in FIG. 15. The container is closed by a lid 31h having a top disc 32h and a short, downward directed outer skirt 36h depending from the disc 32h. The scallops 41 of the deformed portion extend inwardly across the disc 32h of the lid. With the scalloped edge 41, the thickness and rigidity of the deformed distal portion 26h may be increased without adversely affecting the deformability of the band as the scalloped edge 41 is easier to deform than a continuous tamper-evident band. Further, the inward extent of distal portion 26h when deformed may be increased.

The lid 31h may be applied before or after the deformation of distal portion 26h. When the lid is applied after deforming the scalloped edge 41, the deformed portion should have a relatively tight curvature as shown in FIGS. 14 and 15 in order to permit the lid to bypass the deformation. Providing the tamper-evident band 18h with a tightly curled scalloped edge facilitates the application of the lid 31h after the band has been deformed since the lid need only displace the scallops 41. When the lid is applied before the band is deformed, the distal portion may have a tight curvature as shown in FIG. 15 or the distal portion may be substantially flat as shown in FIG. 16.

FIG. 16 depicts a container 11i having a tamper-evident band 18i with a scalloped edge 41i and a modified lid 31i. The lid 31i is substantially similar to the lid shown in FIG. 5 and has a top disc 32i, an upward extending edge 33i, an annular ring 34i extending outwardly from the edge 33i, and a downward directed skirt 36i. The deformed portion 26i of the tamper-evident band is in the form of a generally flat curl and extends inwardly across the annular ring and downwardly along the edge 33i. The lid 31i is applied before the band is deformed, with the annular ring 34i providing a mandrel for curling the scalloped edge 41i to the condition shown in FIG. 16. The scallops 41i essentially grip the ring 34i to prevent removal of the lid with the tamper-evident band intact. Although the band 18i has a scalloped edge 41i, it should be understood that the tamper-evident band may be continuous instead of interrupted.

The tamper-evident band may also be formed with frangible means as shown in FIGS. 17 and 18. Container 11j has a tamper-evident band 18j formed with several vertically extending lines of weakness 42. The number of weakened lines formed in the tamper-evident band may vary as desired. The lines of weakness 42 are an additional tamper-evident feature of the container 11j. If attempts are made to remove the lid 31j without first removing the band 18j, one or more of the lines of weakness 42 will fracture, providing visible evidence that the contents of the container may have been tampered with. The deformed portion 26j may be slightly curved as shown, substantially flat, or provided with a tight curvature. The lid 31j is preferably applied before the distal portion of the band 18j is deformed to minimize the risk of rupturing the lines of weakness during application of the lid. However, the lid may also be applied after the distal portion 26j has been deformed.

The scalloped edge 41 and the weakened lines 42 offer the several advantages including additional options for the configuration of the deformed portion of the band and increased tamper-evidency. The tamper-evident band may also have other features in accordance with the present invention which improve the deformability of the band and the tamper-evidency of the container.

The lid may optionally include tamper-evidencing means which cooperate with the tamper-evident band on the container to further prevent removal of the lid with the tamper-evident band intact. A modified lid 31k suitable for use with the containers of the previously described embodiments is shown in FIGS. 19 and 20. The lid 31k has a top disc 32k formed with an annular groove 57 and an outer skirt 36k depending from the periphery of the disc 32k. A locking bead 28k on the interior of the outer skirt 36k snaps under a locking bead 29k on the exterior of container 11k to retain the lid on the container when it is used as a reclosure lid. The deformed distal portion 26k of the band extends inwardly across the periphery of the lid and has a terminus 58 which is preferably positioned in groove 57. The deformed portion of the band 18k retains the lid on the container and prevents removal of the lid 31k with the tamper-evident band intact. The engagement between the band and the groove 57 substantially conceals the terminus of the band to further inhibit removal of the lid with the tamper-evident band intact.

Turning to FIG. 21, a lid 31l includes additional means which may be used for concealing the terminus of the deformed band 18*l*. The lid 31*l* has a top disc 32*l*, an upward extending portion 61, an annular groove 57*l* adjacent the upward extending portion 61 and a peripheral annular rim 62 extending outwardly from the groove 57*l*. An outer skirt 36*l* depending from the peripheral edge of the rim 62 engages the exterior of the downward depending portion 161 to prevent unintentional dislodgement of the lid from the container. The deformed portion 26*l* of the band extends across the peripheral annular rim 62 and seats in the groove 57*l* to conceal the terminus 58*l* of the band. When the distal portion 26*l* is deformed, the terminus of the band 18*l* is directed into the groove 57*l* by the upward extending portion 61. Optionally, a locking bead 63 on the band 18*l* engages a locking bead 64 on the wall of the groove 57*l* to secure the terminus of the band in the groove. The interengagement between the locking beads 63 and 64 provides further tamper-evidencing means, substantially preventing any attempts to pry the distal portion 26*l* outward and remove the lid 31*l* with the tamper-evident band 18*l* intact.

FIG. 22 shows a modification to the lid to assist stacking while maintaining the tamper-evident features of the lid design of FIG. 21. When several lids are nested in a stack for transportation or storage, the the upward directed ring 61*m* fits inside of the skirt 36*m* of the upper lid and the groove 57*m* and peripheral edge 62*m* are positioned below the skirt 36*m* of the upper lid. Arranging several lids in a vertical stack facilitates the handling of the lids and minimizes the space occupied by the lids during transportation and storage.

The modified lid 31*n* shown in FIG. 23 has an upward extending rib 65 extending circumferentially around the peripheral edge of the top 32*n* of the lid. The distal portion 26*n* of the tamper-evident band 18*n* is deformed to an inward extending orientation with the terminus 58*n* engaging the inner edge of the rib 65. The rib 65 prevents the deformed distal portion 26*n* of the band from being pried outward in an attempt to remove the lid without first removing the band from the container. The lid 31*n* is preferably applied to the container 11*n* before the distal portion 26*n* is deformed, although the band may be deformed before application of the lid 31*n* if the deformed distal portion has a tight curvature as shown FIG. 23.

The rib 65 may be in the form of an upward extending flange as shown in FIG. 23, or the rib may be formed in other shapes. For example, a lid 31*p* having a rounded peripheral rib 65*p* is shown in FIG. 24. The rib 65*p* provides a mandrel for curling or deforming the distal portion 26*p* to the condition shown in FIG. 24. The deformed portion 26*p* extends around the peripheral rib and the terminus of the band 18*p* engages the inner edge of the rib 65*p*, preventing displacement of the distal portion 26*p* relative to the lid. Thus, the peripheral rib 65*p* provides additional tamper-evidencing means.

In each of the previously described embodiments, the container 11 is formed of a plastic material as for example polyethylene. However, other materials may be used to form the container such as composites or laminates as for example a polymer coated paperboard. The band may be formed of a deformable material such as polypropylene or deformable composites and laminates such as a polypropylene-coated paper. Various additives acceptable with the technology as for example clarifying additives, colorants and antistats may be added to the material used to form the container and/or band. The lid may be formed the same material as the container or another suitable material. An optimum thickness range for a band formed of polypropylene is 0.01 to 0.03 inches. The band may be integrally formed with the container or may be attached to the container by ultrasonic welding, adhesives or other suitable securing means. The container, band and lid are preferably molded, but may also be formed using other suitable manufacturing processes as for example thermoforming, stamping and the like.

As is illustrated by the previously described embodiments, the shape of the deformed portion of the band is subject to considerable variation. The total curvature of the deformed portion may vary from 90° to more than 360° and the length of the band may be increased or decreased provided the band extends partially across a peripheral outer portion of the lid. The tamper-evident band may be continuous or interrupted. The band may be bent to the different configurations by modifying the shape of the concave surface 22 of the tooling 21. Further, the tamper-evident band may be deformed by a single tool or several different tools successively lowered onto the band. It is to be understood that a container and lid in accordance with the present invention may have any suitable combination of the features shown in the various modifications illustrated by the Figures, the invention is not to be limited to the specific modifications shown in the Figures.

Except as set forth above, the modifications of FIGS. 6–6A, 7, 8, 9–10, 11, 12–13, 14–15, 16, 17–18, 19–20, 21, 22, 23 and 24 resemble those of the preceding modifications and the same reference numerals followed by the subscripts b-n and p, respectively, are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A container for use with a lid having a peripheral outer portion, said container comprising:

a body having an open end and a lip surrounding said open end, said body having an exterior, a band surrounding said body vicinal said open end, said band having a proximal portion and a distal portion, and frangible means frangibly attaching said proximal portion of said band to said body, said distal portion being deformable to an inward extending orientation shaped and positioned to extend inwardly across said peripheral outer portion of said lid when said lid is applied to said container, whereby said distal portion retains said lid on said container, said distal portion having a terminus spaced outward of said lip when said distal portion is deformed to said inward extending orientation.

2. The container of claim 1 in which said terminus of said distal portion of said band is positioned above said lip when said distal portion is deformed to said inward extending orientation.

3. A container for use with a lid having a peripheral outer portion, said container comprising:

a body having an open end, a lip surrounding said open end, and exterior, and a downward directed portion depending from said lip, a band surrounding said body vicinal said open end, said band having a proximal portion and a distal portion, and frangible means frangibly attaching said proximal portion of said band to said downward directed portion of said lip, said distal portion being deformable to an inward extending orientation shaped and positioned to extend inwardly across said peripheral outer portion of said lid when said lid is applied to said container, whereby said distal portion retains said lid on said container.

4. The container of claim 3 in which said distal portion of said band is opposed to and spaced above said lip when said distal portion is deformed to said inward extending orientation.

5. The container of claim 3 in which said distal portion has a curvature in the range of approximately 90° to 360° when deformed to said inward extending orientation.

6. The container of claim 3 in which said distal portion is formed in a plurality of scallops, said scallops being deformable to an inward extending orientation with said scallops positioned to extend inward across said peripheral outer portion of said lid when said lid is applied to said container.

7. The container of claim 3 in which said band includes at least one vertically extending line of weakness.

8. The container of claim 3 in which said tamper-evident band is molded with an integral tear tab.

9. The container of claim 3 which said band is removable from said container by manipulating at least a portion of said band relative to said container to rupture said frangible means.

10. A container for use with a lid having a peripheral outer portion, said container comprising:

a body having an open end, a lip surrounding said open end, an exterior and an outward extending annular flange below said lip, a band surrounding said body vicinal said open end, said band having a proximal portion and a distal portion, and frangible means frangibly attaching said proximal portion of said band to said flange, said distal portion being deformable to an inward extending orientation shaped and positioned to extend inwardly across said peripheral outer portion of said lid when said lid is applied to said container, whereby said distal portion retains said lid on said container.

11. In combination, a container and a lid therefor, said container comprising a body having an open end and a lip surrounding said open end, said body having an exterior, a band surrounding said body vicinal said open end, said band having a proximal portion, a distal portion, and a terminus, and frangible means frangibly attaching said proximal portion of said band to said body, said lid having a top covering said open end and a peripheral outer portion, and an annular groove formed in said top, said distal portion of said band being deformable to an inward extending orientation extending inwardly across said peripheral outer portion of said lid with said terminus being positioned in groove, and said container having first locking means on said band and said lid having second locking means associated with said groove, said first and second locking means being shaped and positioned to interengage when said distal portion is deformed to retain said terminus of said distal portion in said groove, whereby said distal portion of said band retains said lid on said container.

12. The combination of claim 11 in which said top has an upward directed portion shaped and positioned for guiding said terminus of said distal portion into said groove.

13. The combination of claim 11 in which said top has an upward directed portion shaped and positioned for concealing said terminus of said distal portion.

14. The combination of claim 11 in which said top of said lid is formed with an annular stacking ring.

15. The combination of claim 11 in which said lid has an outer skirt depending from said top proximate said exterior of said body.

16. The combination of claim 15 in which said lid has a peripheral flange extending outwardly from said outer skirt, said deformed portion of said band extending inwardly across said peripheral flange.

17. The combination of claim 11 in which said container has first engagement means and said lid has second engagement means mating with said first engagement means to retain said lid on said container after said band has been removed from said container.

18. The combination of claim 11 in which said body has an interior, said top of said lid includes an outer edge engaging said interior of said body and an upward directed portion extending upwardly from said outer edge, and said outer portion of said lid comprises an annular ring extending outwardly across said lip from said upward directed portion of said top, and in which said distal portion of said band extends inwardly across said ring.

* * * * *